(No Model.) 2 Sheets—Sheet 2.
H. BÜSSING.
ANTI-FRICTION ROLLER BEARING.
No. 253,679. Patented Feb. 14, 1882.
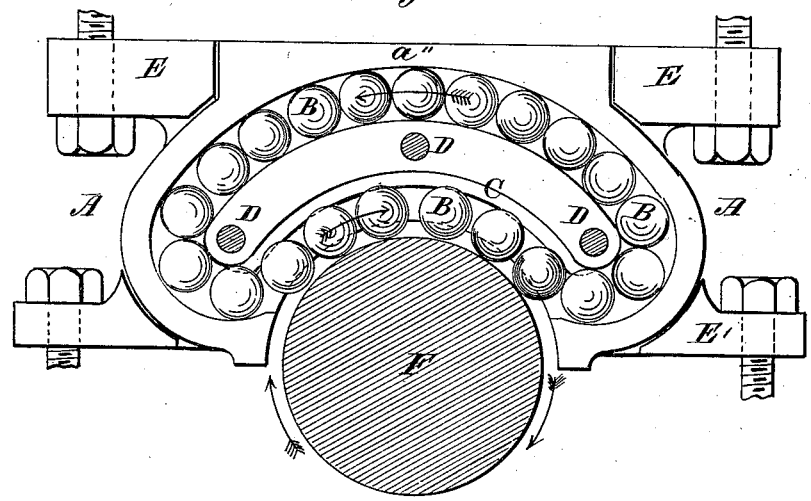
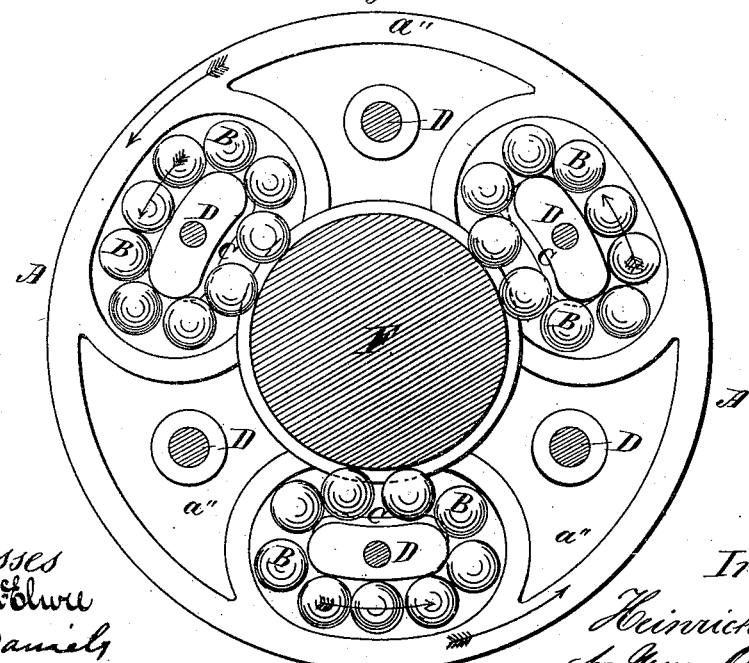

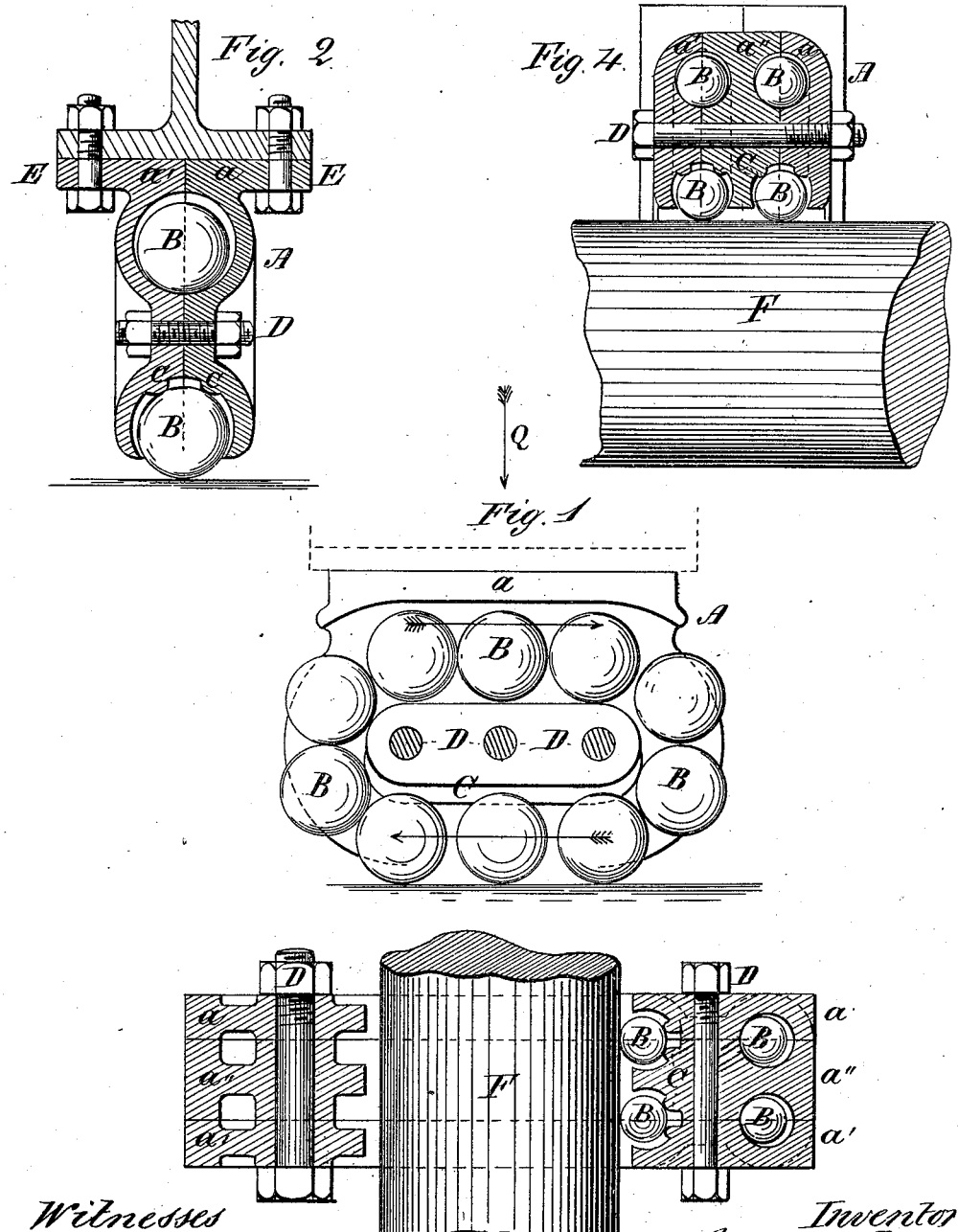

UNITED STATES PATENT OFFICE.

HEINRICH BÜSSING, OF BRUNSWICK, BRUNSWICK, GERMANY.

ANTI-FRICTION ROLLER BEARING.

SPECIFICATION forming part of Letters Patent No. 253,679, dated February 14, 1882.

Application filed January 9, 1882. (No model.)

*To all whom it may concern:*

Be it known that I, HEINRICH BÜSSING, engineer, subject of the Duke of Brunswick, residing at Brunswick, in the Dukedom of Brunswick, German Empire, have invented certain new and useful Improvements in Anti-Friction Roller Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention has for its object to reduce to a minimum the frictional resistance in moving a load upon a stationary track or way by the use of rolling or movable balls, whereby all journal friction is avoided and a rolling friction only is exerted between the bearing-surfaces.

The further object of the invention is to apply these movable balls to vehicles instead of the ordinary wheels, and also to journal-bearings.

The invention consists essentially in the use of a number of balls arranged to travel around a track or way when brought in contact with a movable body as a journal, or when moved over a stationary body, such as a road or track.

The invention further consists in the construction of devices whereby the desired results may be obtained in the simplest manner, all as hereinafter more fully described, and as shown in the accompanying two sheets of drawings, in which—

Figures 1 and 2 are longitudinal and transverse sections, respectively, of appliances to be used in lieu of wheels for moving loads. Figs. 3 and 4 are like views, respectively, illustrating the invention as applied to journal-bearings. Figs. 5 and 6 are also longitudinal and transverse sections, respectively, of a modified journal-bearing.

Like letters of reference are employed to indicate like parts wherever such may occur in the drawings.

A is the casing, made in two sections, a a', in which are arranged in the form of a ring a number of balls, B, so that the said balls B may move one after another without resistance, either in a circular or other path. At its lower end the casing A is open, as shown in Figs. 1, 2, 3, and 4, so that the rolling balls of the ball-ring will come in contact with the surface upon which they move or by which they are moved. The casing A has a track composed of semi-spherical ribs C upon that side where the balls project therefrom, and are in contact with the surface upon which they move or by which they are moved, as shown. The pressure that is exerted upon the casing A by a load in the direction of the arrow Q, Fig. 1, is transmitted by the ribbed track C to the balls and through these to their stationary support, as in said Fig. 1. If power is applied to the casing to move it toward the right, then the balls B will be moved in the casing in the direction of the arrows and traveling along a circular or other track, whereby they are brought successively in contact with the supporting-surface. While these balls are moving along the ribbed track C, which is parallel with the supporting-surface, they act as carriers or bearing-surfaces for the load, and, rolling, simultaneously produce motion between the bearing-surfaces.

To avoid friction between any two of those balls B which act as carriers, sufficient space is provided to allow them slight play, which space always exists between said carrier-balls when on the track C, and the contact between them takes place at that time only when one of said balls is freed from pressure, and it is then moved along by the succeeding ball, as shown. The number of balls simultaneously in contact with the supporting track or way is not a fixed one. As shown in Fig. 1, three such balls are always in contact with said track. By means of screw-bolts D D the two parts of the casing are bolted together, and by means of the flanges E said casing may be bolted to any suitable receptacle for containing the load. The described construction may be used on vehicles instead of wheels, in which case such vehicle is provided with four of these casings.

In Figs. 3 and 4 the construction is illustrated in the form of an axle-box, and it may also be used in this form as a shaft-bearing by simply reversing the casing, as shown—that is, when used in the form of an axle-bearing the pressure is exerted by the load upon the balls and through them upon revolving axle; but when reversed and used as a shaft bearing, then the pressure is exerted by the revolving shaft upon the balls and through them upon the casing—that is, in a reverse direction. In this construction, as shown in Fig. 4, I employ preferably two series of balls B, and the casing A is made in three sections, $a$ $a'$ $a''$, instead of two, as above set forth, the section $a''$ of which contains one-half of the guide-track for the two series of balls. The periphery of the axle F or the shaft, as the case may be, serves as a moving track or way for the balls, and to that end the ribbed track C C is made concentric with the axle or shaft. By means of the bolts D the three sections of the casing inclosing the balls are bolted together, and by means of the flanges E E said casing may be bolted to any suitable receptacle for containing the load, or, when reversed, to suitable supports for the shaft-bearings. In either case a cover may be combined with the axle-box or shaft-bearing by means of the flanges E' E'. If lateral pressure is exerted upon the box or bearing and the axle rotated in the direction of the arrows, the balls will move in a like direction, as indicated by arrows, and one after the other will be brought in contact with the periphery of the axle or shaft and the ribbed track C, and perform the function of rolling carriers between the load and the axle. Several of the described bearings may be united into a single bearing. To counteract any lateral oscillation of the axle in its bearings the former may be provided with grooves upon that part of its periphery over which the balls travel.

In Figs. 5 and 6 the bearing is shown in an annular form, to be applied to a wheel rotating upon an axle or shaft. Here, also, two adjacent series of balls are employed, and the casing is consequently also made in three sections, $a$ $a'$ $a''$. As shown in Fig. 5, around the axle or shaft are arranged three such bearings equidistant from each other, all combined in one casing A, and constituting a bearing for a wheel-hub. Each ball system is composed of two adjacent series of balls B, the circular casing being composed of three sections, $a$ $a'$ $a''$, as shown, said sections being united by means of screw-bolts D. The annular bearing may be combined with the hub of a wheel in various ways. If pressure is applied to the stationary axis and the bearing rigidly connected with a wheel rotated thereby in the direction indicated by the arrows, all the balls of the three systems will move in the same direction, as indicated by the respective arrows of the three systems. Every ball in its turn is thus simultaneously brought in contact with the periphery of the axle or shaft and the ribbed track C, and interposed between the pressure of the two.

This ball-wheel in its various uses offers no inconsiderable advantages. It reduces the loss of power, as ascertained by experiment, at least to one-third of that which occurs in bearings of usual construction, and the expenses of oiling are avoided.

Having now described my invention, what I claim, and desire to secure by Letters Patent, is—

1. The means employed for reducing the friction of the bearing-surfaces of a stationary and a moving body, which consists essentially in the combination of two such bodies, an endless track, and a series of spheres interposed between the bearing-surfaces of said bodies, said spheres being impelled by the moving body and caused to continuously travel around said track, which latter is arranged to cause the spheres to be successively brought into and moved out of contact with the bearing-surfaces of the two bodies, as described.

2. The casing A, composed of two or more sections, in which is formed an endless track or tracks having an opening in one portion thereof, a series of spheres, B, arranged to travel freely around said track when impelled by frictional contact with another body and projecting partly through the track to establish said frictional contact, in combination with a stationary track or road upon which said casing is moved to impel the spheres, or a moving shaft or axle that imparts motion to said spheres, all arranged for operation as described.

3. The combination, with the casing A and the spheres B, of an endless track, one section of which is provided with rails or ribs C, substantially as and for the purpose specified.

In testimony whereof I affix my signature in presence of two witnesses.

HEINRICH BÜSSING.

Witnesses:
WILLIAM C. FOX,
JOHS. KRACKE.